United States Patent [19]

Ezaki

[11] Patent Number: 5,402,187
[45] Date of Patent: Mar. 28, 1995

[54] METHOD AND APPARATUS FOR TRANSMITTING A VIDEO SIGNAL ALONG WITH A CODE REPRESENTING AN ASPECT RATIO OF THE VIDEO SIGNAL

[75] Inventor: Tadashi Ezaki, Tokyo, Japan

[73] Assignee: Sony Corporation, Tokyo, Japan

[21] Appl. No.: 9,568

[22] Filed: Jan. 26, 1993

[30] Foreign Application Priority Data

Jan. 27, 1992 [JP] Japan .................................. 4-012279

[51] Int. Cl.⁶ .......................................... H04N 7/087
[52] U.S. Cl. ..................................... 348/474; 348/478; 348/913; 358/335
[58] Field of Search ............... 358/180, 147, 146, 140, 358/141, 11, 12, 335, 341; H04N 5/68, 7/00; 348/445, 474, 477, 476, 913, 478

[56] References Cited

U.S. PATENT DOCUMENTS

| | | | |
|---|---|---|---|
| 4,394,690 | 7/1983 | Kobayashi | 358/180 |
| 4,654,696 | 3/1987 | Dayton et al. | 358/11 |
| 4,951,149 | 8/1990 | Faroudja | 358/230 |
| 5,122,885 | 6/1992 | Yoshioka et al. | 358/310 |
| 5,132,807 | 7/1992 | Takimoto et al. | 358/335 |
| 5,136,398 | 8/1992 | Rodrigues-Cavazos et al. | 358/242 |
| 5,150,218 | 9/1992 | Ezaki | 358/310 |
| 5,218,436 | 6/1992 | Sugiyama et al. | 358/141 |

FOREIGN PATENT DOCUMENTS

| | | | |
|---|---|---|---|
| 0424654 | 5/1991 | European Pat. Off. | H04N 7/00 |
| 0507614 | 10/1992 | European Pat. Off. | H04N 5/92 |
| 0083179 | 7/1981 | Japan | H04N 3/22 |
| 0082884 | 3/1990 | Japan | H04N 7/00 |

Primary Examiner—Victor R. Kostak
Assistant Examiner—Nathan J. Flynn
Attorney, Agent, or Firm—Jay H. Maioli

[57] ABSTRACT

A signal from an aspect ratio input means (3) is supplied to a code signal generating circuit (4). Further, a video signal from a signal source (1) is supplied to a code signal inserting and adding circuit (5), in which it is added with the code signal from the code signal generating circuit (4). The video signal into which the code signal is inserted and added is supplied to a video cassette recorder (VCR) (6) and thereby recorded on a recording medium (7). Further, a reproduced signal from the VCR (6) is supplied to an image processing circuit (8). The reproduced signal is also supplied to a decoder (9) which discriminates a code signal of the above aspect ratio. The code signal of the discriminated aspect ratio is supplied to the image processing circuit (8), thereby enlarging or reducing a reproduced picture. Further, the video signal in which the picture is enlarged or reduced is supplied to a receiver (10) having an aspect ratio of 16:9 and a reproduced picture enlarged or reduced is thereby displayed.

9 Claims, 10 Drawing Sheets

FIG. 6A
(Ordinary NTSC Video Signal)

FIG. 6B
(Letter Box-Type Video Signal)

FIG. 6C
(Cinema Scope Size Video Signal)

| Type of Processing \ Video Signal Source | Full Mode Video Signal Aspect Ratio, 16:9 | Letter Box-Size Video Signal Aspect Ratio, 16:9 | Normal Video Signal Aspect Ratio, 4:3 |
|---|---|---|---|
| Process Picture in Vertical and Horizontal Directions by Memory | Unchanged in Vertical Direction<br>Unchanged in Horizontal Direction<br>Number of Scanning Lines 480 (480) | Enlarged in Vertical Direction<br>Unchanged in Horizontal Direction<br>Number of Scanning Lines 480 (360) | Unchanged in Vertical Direction<br>Squeezed in Horizontal Direction<br>Number of Scanning Lines 480 (480) |
| Process Picture in Vertical Direction by Controlling Deflection Width and Also Process Picture in Horizontal Direction by Memory | 100% in Vertical Direction<br>Unchanged in Horizontal Direction<br>Number of Scanning Lines 480 (480) | 133% in Vertical Direction<br>Unchanged in Horizontal Direction<br>Number of Scanning Lines 360 (360) | 100% in Vertical Direction<br>Squeezed in Horizontal Direction<br>Number of Scanning Lines 480 (480) |
| Process Picture in Vertical Direction by Memory and Also Process Picture in Horizontal Direction by Controlling Deflection Width | Unchanged in Vertical Direction<br>100% in Horizontal Direction<br>Number of Scanning Lines 480 (480) | Enlarged in Vertical Direction<br>100% in Horizontal Direction<br>Number of Scanning Lines 480 (360) | Unchanged in Vertical Direction<br>75% in Horizontal Direction<br>Number of Scanning Lines 480 (480) |

Parenthesred Numerical Values Represent Substantial (Original) Number of Scanning Lines

METHOD AND APPARATUS FOR TRANSMITTING A VIDEO SIGNAL ALONG WITH A CODE REPRESENTING AN ASPECT RATIO OF THE VIDEO SIGNAL

BACKGROUND OF THE INVENTION

1. Field of the Invention

The present invention relates to method and apparatus for transmitting video signals having a plurality of aspect ratios, such as movie software or the like.

2. Description of the Prior Art

Figure 1A:
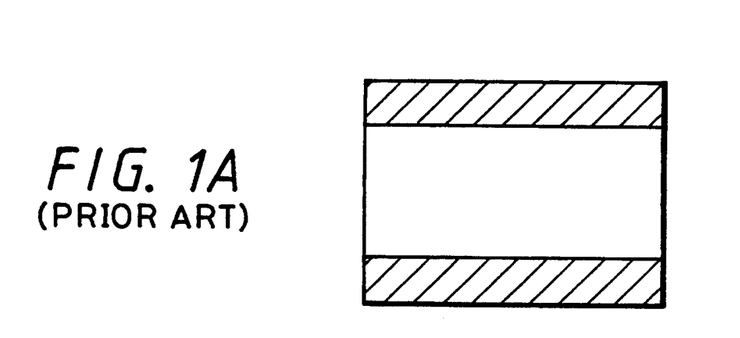
FIGS. 1A through 1C are diagrams used to explain the prior art, respectively.

Movies for theaters employ, in addition to a standard size picture having an aspect ratio of 4:3, a variety of picture systems such as an European Vista Vision (registered trademark) size picture having an aspect ratio of 1.66:1, an American Vista Vision size pictures having an aspect ratio of 1.85:1, a 70-mm size picture having an aspect ratio of 2.18:1, a Cinema Scope (registered trademark) size picture having an aspect ratio of 2.35:1 or the like. When such movie for theaters is converted into a present video signal having an aspect ratio of 4:3 (=1.33:1), a so-called letter box system is used, in which right and left portions of a reproduced picture are made coincident with right and left portions of a picture screen and black portions (shown hatched) are provided on the upper and lower portions of the picture screen as shown in FIG. 1A.

Figure 1B:
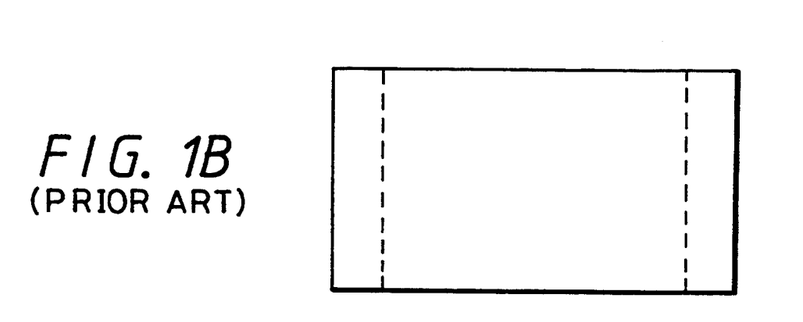

While the present video signal has an aspect ratio of 4:3, a video signal having a wide aspect ratio of 16:9 (=1.78:1) has been proposed and a monitor receiver that can receive and reproduce such video signal is now commercially available on the market. Under the present condition, most video signals have an aspect ratio of 4:3 and a few video signals has an aspect ratio of 16:9. Therefore, when the video signal having an aspect ratio of 4:3 is supplied to the monitor receiver that receives and reproduces the video signal having an aspect ratio of 16:9, some suitable processing such as to display a reproduced picture of the video signal on the center of the picture screen or the like is carried out, as shown in FIG. 1B.

Figure 1C:
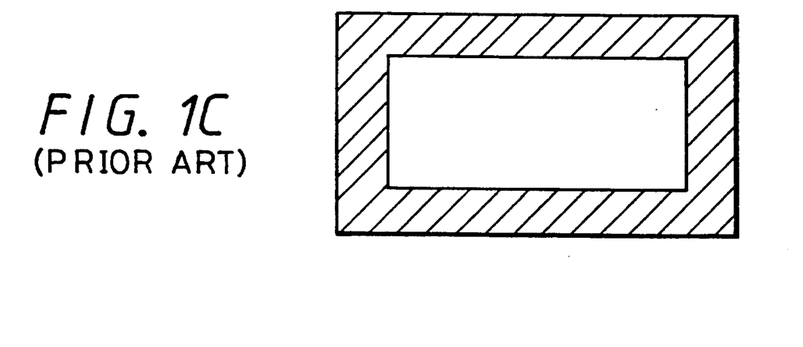

When the above-mentioned monitor receiver receives and reproduces the above letter box-type video signal, a reproduced picture is presented as shown in FIG. 1C, wherein the letter box type video signal is displayed in the range having an aspect ratio of 4:3 displayed on the center of the picture screen having an aspect ratio of 16:9. That is, black portions (shown hatched) are provided on the upper, lower, right and left portions of the picture screen. To remove this drawback, it is proposed that the monitor receiver includes means for enlarging a reproduced picture. Then, the viewer controls a magnification in a manual fashion so that the reproduced picture is displayed on the whole picture screen.

As a means for enlarging a reproduced picture, there are employed a method for enlarging a reproduced picture by using an image memory according to an image processing such as an interpolation or the like and a method for enlarging a reproduced picture by enlarging deflection widths in the horizontal and vertical directions. In this case, the reproduced picture is enlarged such that the upper and lower portions of the reproduced picture coincide with the upper and lower portions of the picture screen. Accordingly, a reproduced picture of European Vista Vision size having an aspect ratio smaller than the aspect ratio of 16:9 is enlarged such that the black portions are left on the right and left portions of the picture screen. Further, the reproduced pictures of American Vista Vision size, of 70mm-size and of Cinema Scope size, each having aspect ratios larger than the aspect ratio of 16:9, are enlarged such that the right and left portions of the reproduced picture are cut down slightly.

According to the aforesaid method in which the viewer controls a magnification in a manual fashion, the viewer is annoyed by cumbersome operation. Also, when a video signal having a different aspect ratio is received and reproduced, if the viewer does not notice that the last magnification control operation is still effective, there is then the risk that a picture will not be received and reproduced correctly. Furthermore, U.S. Pat. No. 4,951,149 describes a method for enlarging a picture by adjusting deflection voltages both in the horizontal and vertical directions. This previously-proposed method imposes a problem such that a resolution of an enlarged reproduced picture is deteriorated considerably.

OBJECTS AND SUMMARY OF THE INVENTION

In view of the aforesaid shortcomings and disadvantages of the prior art, it is an object of the present invention to provide method and apparatus for transmitting a video signal in which the viewers can be made free from cumbersome operation when a reproduced picture is enlarged or reduced in size.

It is another object of the present invention to provide method and apparatus for transmitting a video signal in which a deterioration of resolution of a reproduced picture when the reproduced picture is enlarged or reduced in size can be improved.

According to a first aspect of the present invention, there is provided a method of transmitting a video signal which comprises the steps of generating a video signal of letter-box type and outputting the same, and converting an aspect ratio of letter-box type video signal into a code signal and superimposing the same upon a vertical blanking period of the video signal.

According to a second aspect of the present invention, there is provided an apparatus for recording a video signal which comprises a code signal generating circuit for converting an aspect ratio of a letter-box type of an input video signal into a code signal, a code signal adding circuit for adding the code signal to the video signal, and a recording circuit for recording the video signal added with the code signal on a recording medium.

According to a third aspect of the present invention, there is provided a method of recording a video signal which comprises the steps of generating a code signal in response to an aspect ratio of a letter-box type of an input video signal, adding the code signal to the video signal, and recording the video signal added with the coded signal on a recording medium.

According to a fourth aspect of the present invention, there is provided a video signal processing apparatus which comprises a code signal discriminating circuit for discriminating an aspect ratio of letter-box type of an input video signal encoded into a code signal, an image processing circuit for controlling write and read of the video signal in and/or from a horizontal line memory to thereby enlarge and/or reduce the video signal in a horizontal direction, and a deflection control circuit for controlling a deflection of a display apparatus in response to an aspect ratio discriminated by the code signal when the video signal is displayed on the display apparatus to thereby enlarge and/or reduce the video signal in a vertical direction.

According to a fifth aspect of the present invention, there is provided a video signal processing apparatus which comprises a code signal discriminating circuit for discriminating an aspect ratio of letter-box type of an input video signal encoded into a code signal, an image processing circuit for enlarging and/or reducing the video signal in a vertical direction by using a vertical filter formed of a horizontal line memory in response to an aspect ratio discriminated by the code signal, and a deflection control circuit for controlling a deflection of a display apparatus in response to an aspect ratio discriminated by the code signal when the video signal is displayed on the display apparatus to thereby enlarge and/or reduce the video signal in a vertical direction.

In accordance with a sixth aspect of the present invention, there is provided a video signal processing apparatus which comprises a code signal discriminating circuit for discriminating an aspect ratio of letter-box type of an input video signal encoded into a code signal, and an image processing circuit for controlling write and read of the video signal in and/or from a horizontal line memory to thereby enlarge and/or reduce the video signal in a horizontal direction and enlarging and/or reducing the video signal in a vertical direction by using a vertical filter formed of a horizontal line memory.

In accordance with a seventh aspect of the present invention, there is provided a video signal processing apparatus which comprises a code signal discriminating circuit for discriminating an aspect ratio of letter-box type of an input video signal encoded into a code signal, an image processing circuit for enlarging and/or reducing the video signal in a horizontal direction in response to an aspect ratio discriminated by the code signal by using an FIR (finite impulse response) filter, and a deflection control circuit for controlling a deflection of a display apparatus in response to the aspect ratio discriminated by the code signal to thereby enlarge and/or reduce the video signal in the vertical direction when the video signal is displayed on the display apparatus.

As an eighth aspect of the present invention, there is provided a video signal processing apparatus which comprises a code signal discriminating circuit for discriminating an aspect ratio of letter-box type of an input video signal converted into a code signal, and an image processing circuit for enlarging and/or reducing the video signal in horizontal and vertical directions in response to an aspect ratio discriminated by the code signal.

The above and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIG. 10 is a table used to explain the condition that pictures are displayed when aspect ratios of input video signals are different from that of the television monitor.

DETAILED DESCRIPTION OF THE PREFERRED EMBODIMENT

The present invention will now be described with reference to the accompanying drawings.

Figure 2:
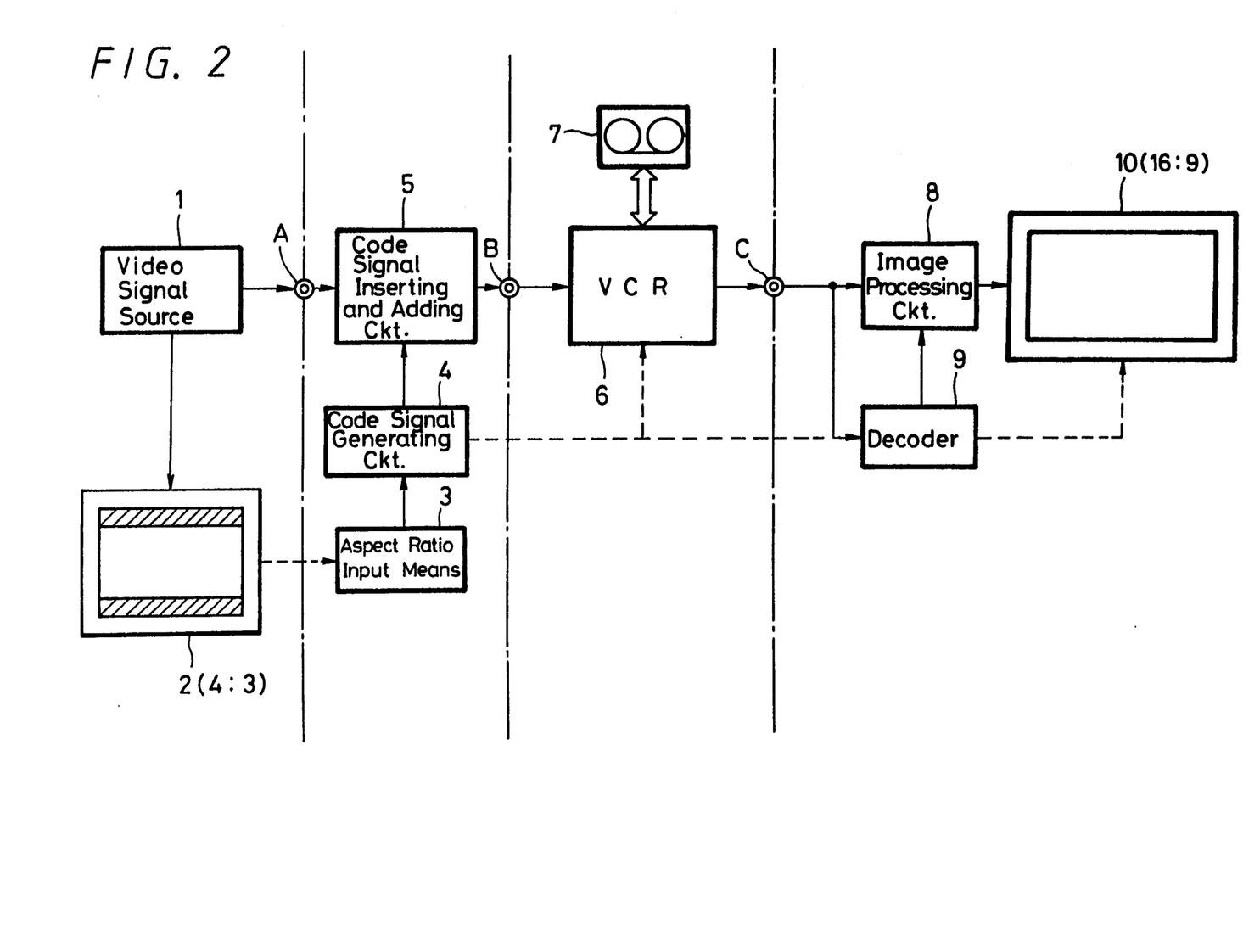
FIG. 2 is a block diagram showing an arrangement of an apparatus which carries out a video signal transmitting method according to an embodiment of the present invention.

As shown in FIG. 2 of the accompanying drawings, there is provided a video signal source 1 for supplying a video signal having an aspect ratio of 4:3, such as a MUSE (multiple sub-Nyquist sampling)—NTSC converter, an NTSC system telecine apparatus (apparatus for forming a video signal from a movie film), a tuner, a master recording and reproducing apparatus or the like. When the video signal from the video signal source 1 is supplied to a monitor receiver 2 having an aspect ratio of 4:3, a reproduced picture of letter box type in which black portions (shown hatched) are provided on the upper and lower portions of the picture in response to the aspect ratio of the original picture is displayed on the picture screen of the monitor receiver 2.

In FIG. 2, reference numeral 3 depicts an aspect ratio input means. When the video signal source 1 is the MUSE-NTSC converter, the aspect ratio of the input means 3 is determined to be 16:9. An aspect ratio of the telecine apparatus is determined in accordance with the type of the movie film. When the video signal source 1 is the tuner or the master recording and reproducing apparatus, an aspect ratio is calculated from the reproduced picture displayed on the monitor receiver 2 and then input by the aspect ratio input means 3.

A signal from the aspect ratio input means 3 is supplied to a code signal generating circuit 4. Also, the video signal from the video signal source 1 is supplied to a code signal inserting and adding circuit 5, in which it is added with the code signal from the code signal generating circuit 4.

Figure 3A:
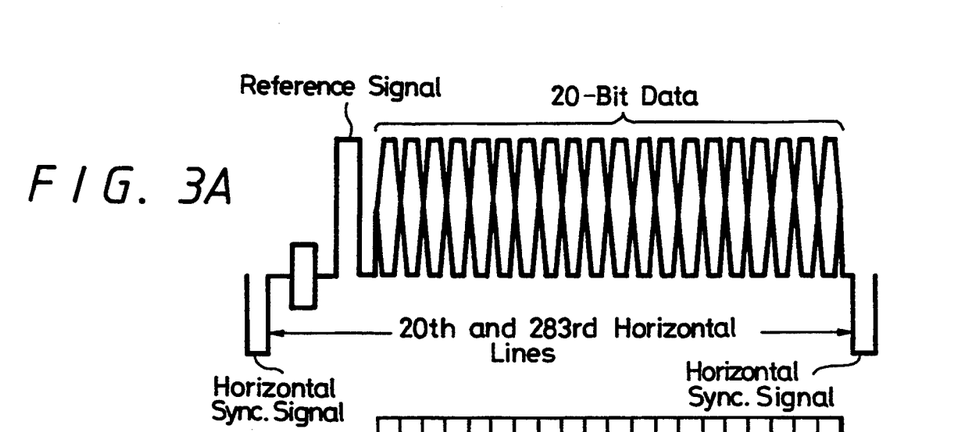
FIGS. 3A is a diagram used to explain the way of how to insert and add a code signal into an NTSC video signal.
Figure 3B:
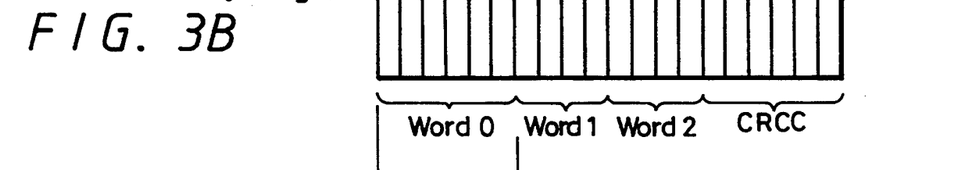
FIG. 3B is a diagram used to explain a data format of 20-bit data.

When the code signal is inserted into and added to the video signal from the video signal source 1, 20-bit data is inserted into and added to the video signal by using 20th and 283rd horizontal lines of the NTSC video signal, for example, as shown in FIG. 3A. The 20-bit data consists of word 0 of 6 bits, words 1 and 2, each being formed of 4 bits, and an error correction code such as CRCC (cyclic redundancy check code) of 6 bits as shown in FIG. 3B.

Figure 3C:
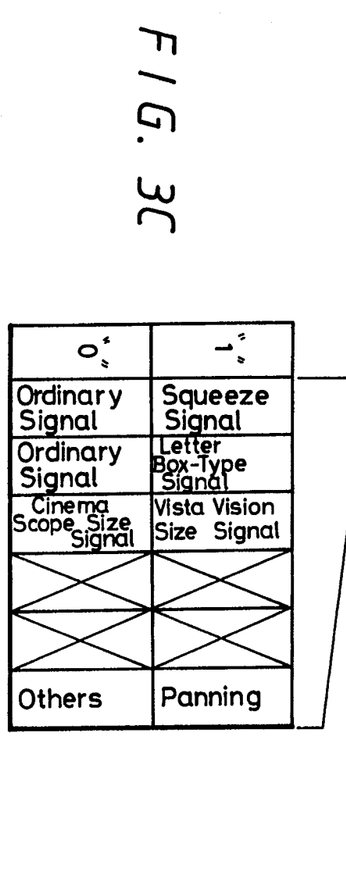
FIG. 3C is a diagram used to explain a word 0 of the 20-bit data shown in FIG. 3B.

As shown in FIG. 3C, a first bit of the word 0 is allocated to a discriminating code that is used to discriminate a squeeze signal ("1") in which the right and left portions of the picture are squeezed and an ordinary signal ("0"). A second bit of the word 0 is allocated to a discriminating code that is used to discriminate a letter box type signal ("1") and an ordinary signal ("0"). Further, a third bit of the word 0 is allocated to a discriminating code that is used to discriminate a Vista Vision size signal ("1") including the video signal from the MUSE—NTSC converter having an aspect ratio of nearly 1.78:1 and a Cinema Scope size signal ("0") including the video signal of 70 mm-size picture having an aspect ratio of substantially 2.2:1. Fourth and fifth bits of the word 0 are not defined yet. A sixth bit of the word 0 is allocated to a discriminating code that is used to discriminate other processing (panning) or the like.

In this way, the aspect ratio code signal is inserted into and added to the video signal. The video signal into which the aspect ratio code signal is inserted and added is supplied to a video cassette recorder (VCR) 6 and is thereby recorded on a recording medium 7 as shown in FIG. 2. The aspect ratio code signal is not always inserted into and added to the video signal. Alternatively, the aspect ratio code signal may be supplied from the code signal generating circuit 4 to the VCR 6 in another way, as shown by a dashed line in FIG. 2, in which it is used to modulate a CTL (control) signal of the VCR 6 or recorded in a code area associated with a PCM (pulse code modulated) audio signal.

For example, the code signal is used to modulate the CTL signal as follows.

Figure 4:
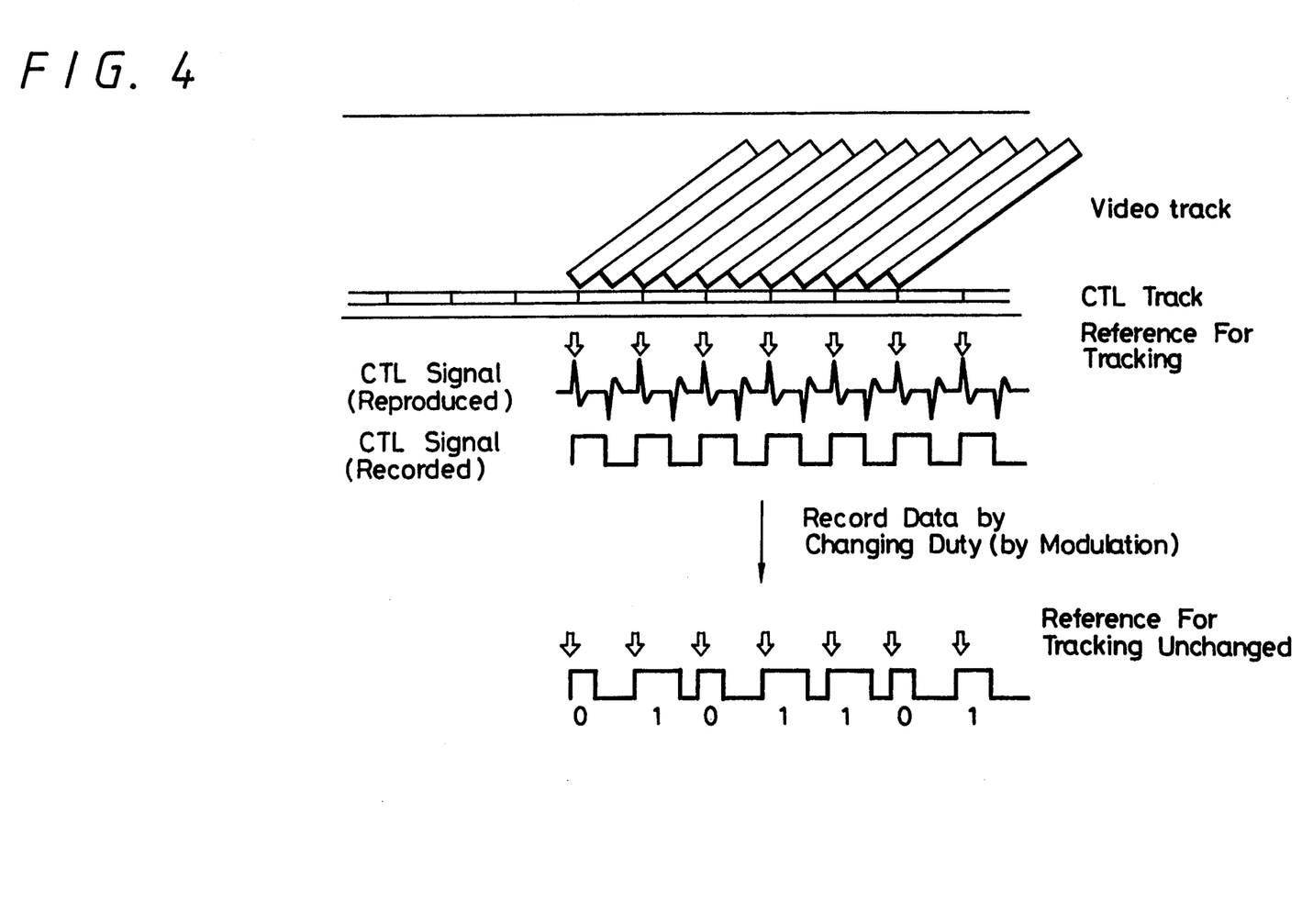
FIG. 4 is a diagram used to explain the recording and reproduction of a CTL (control) pulse.

According to the VCR, a CTL (control) pulse is recorded on a CTL track at every frame as a reference signal for effecting the tracking. When the CTL pulse is used to effect the tracking, only the position of one polarity of this CTL pulse is used. Accordingly, the position of the opposite polarity of the CTL pulse is not defined. Therefore, by changing this position of the CTL pulse in accordance with a predetermined rule, it is possible to record a variety of data as shown in FIG. 4.

This method is adopted by the VHS system and is what might be called a VISS (video index search system) or VASS (video address search system). A similar application is also possible in VCRs that use the CTL track.

Figure 5:
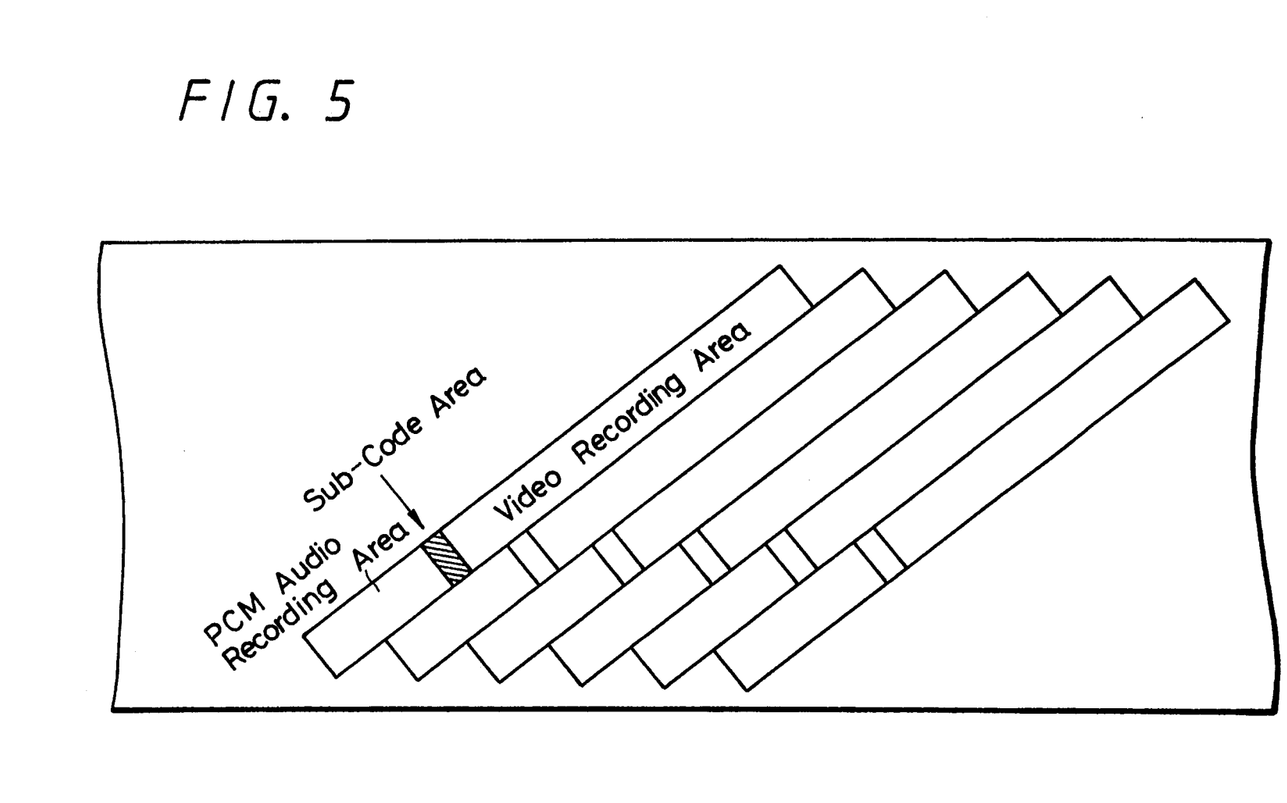
FIG. 5 is a diagram of a track format used by a so-called 8-mm VTR, and to which references will be made in explaining the present invention.

Another method that is employed by so-called 8-mm VTRs is illustrated in FIG. 5. As shown in FIG. 5, a sub-code area for recording sub-code data is provided between a PCM audio signal recording area and a video signal recording area. A variety of additional information can be recorded on this sub-code recording area.

Referring back to FIG. 2, a reproduced signal from the VCR 6 is supplied to an image processing circuit 8. Also, the reproduced signal is supplied to a decoder 9 which then discriminates the above aspect ratio code signal. The aspect ratio thus discriminated is supplied to the image processing circuit 8, whereby a reproduced picture is enlarged or reduced in size. Further, the video signal representative of the picture thus enlarged or reduced in size is supplied to a monitor receiver 10 having an aspect ratio of 16:9, thereby a reproduced picture enlarged or reduced in size being displayed on a picture screen of the monitor receiver 10.

Figure 6A:
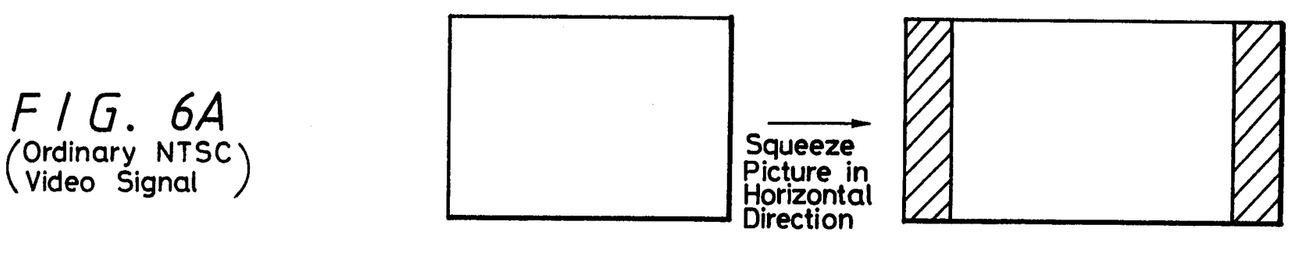
FIGS. 6A through 6C are respectively diagrams used to explain operation of the present invention.
Figure 6B:
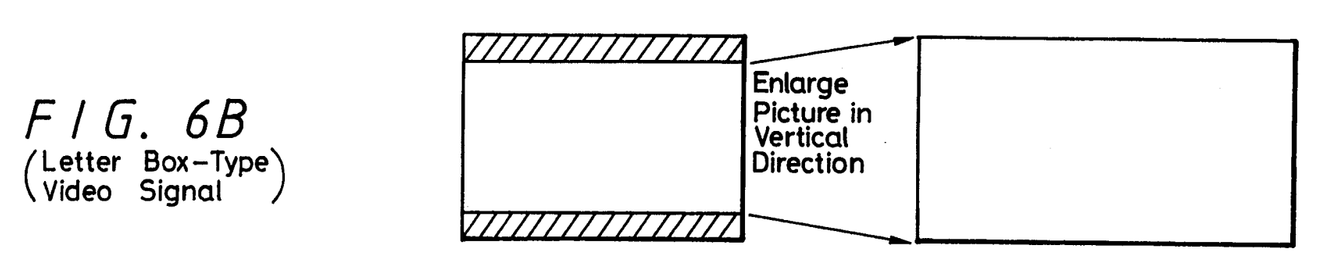
Figure 6C:
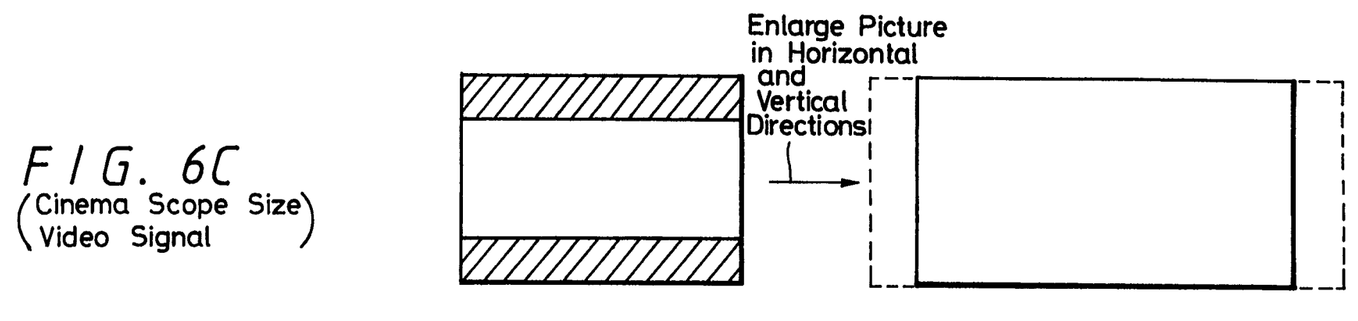

As shown in FIG. 6A, when the standard NTSC video signal having an aspect ratio of 4:3 is supplied to the monitor receiver 10 having the aspect ratio of 16:9, a picture in the horizontal direction is squeezed and then a reproduced picture is displayed on the picture screen of the monitor receiver 10. When the video signal of letter-box type is supplied to the monitor receiver 10 having the aspect ratio of 16:9, as shown in FIG. 6B, a picture in the vertical direction is enlarged and then a reproduced picture is displayed on the picture screen of the monitor receiver 10. When the video signal is the Cinema Scope size signal, for example, a picture in the horizontal and vertical directions is enlarged and then a reproduced picture is displayed on the picture screen of the monitor receiver 10 as shown in FIG. 6C.

The image processing circuit 8 (FIG. 2) will be described more fully below.

Figure 7:
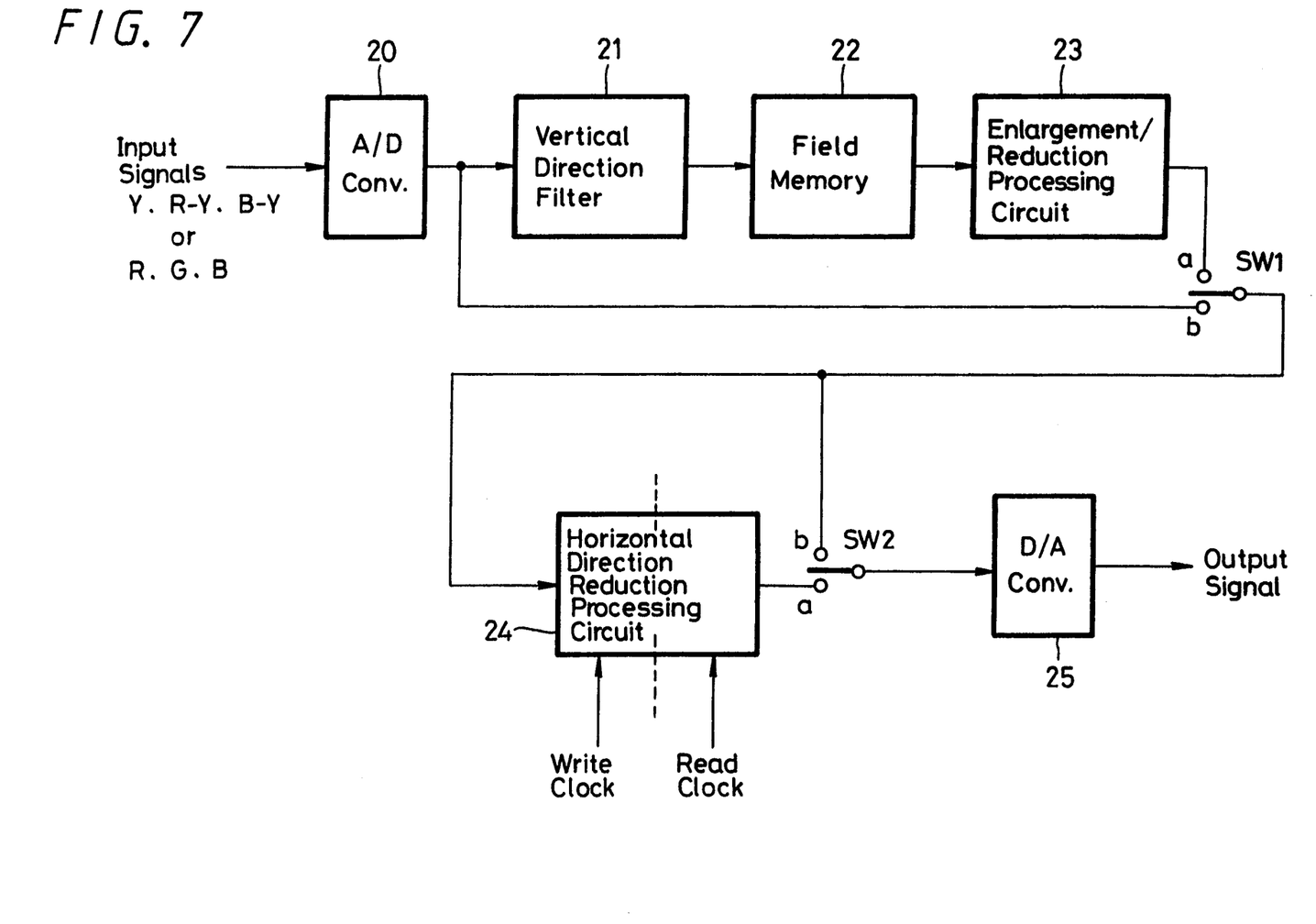
FIG. 7 is a block diagram showing a circuit arrangement of an image processing circuit used in the present invention in detail.
Figure 8:
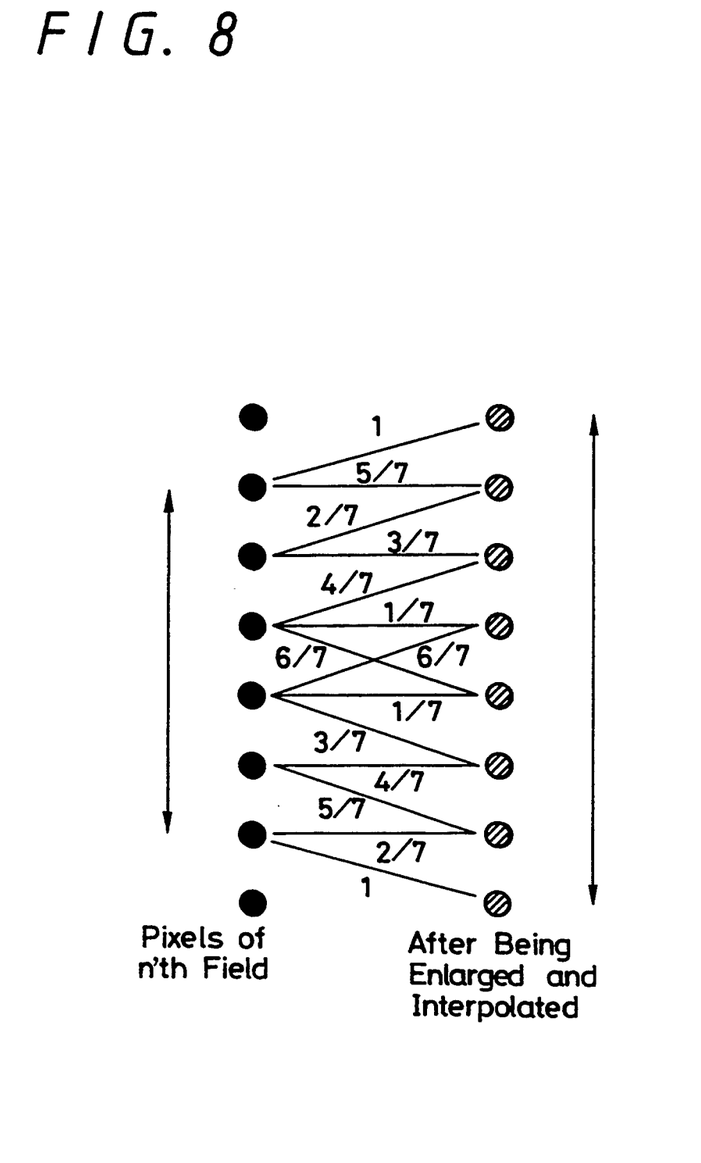
FIG. 8 is a diagram used to explain operation of an enlargement/reduction processing circuit used in the present invention.

The image processing circuit 8 is arranged as shown in FIG. 7. As shown in FIG. 7, an input analog video signal is converted into a digital video signal by an analog-to-digital (A/D) converter 20 and then supplied to a vertical direction filter 21. The vertical direction filter 21 is formed of a line memory to limit a band of the vertical direction to thereby avoid an aliasing noise when a reproduced picture is enlarged and/or reduced. An output signal from the vertical direction filter 21 is supplied through a field memory 22 to an enlargement/reduction processing circuit 23. The enlargement/reduction processing circuit 23 is formed of an FIR (finite impulse response) type filter using a line memory similarly. The enlargement/reduction processing circuit 23 enlarges and interpolates a reproduced picture as shown in FIG. 8 when the reproduced picture is enlarged in size.

Figure 9A:
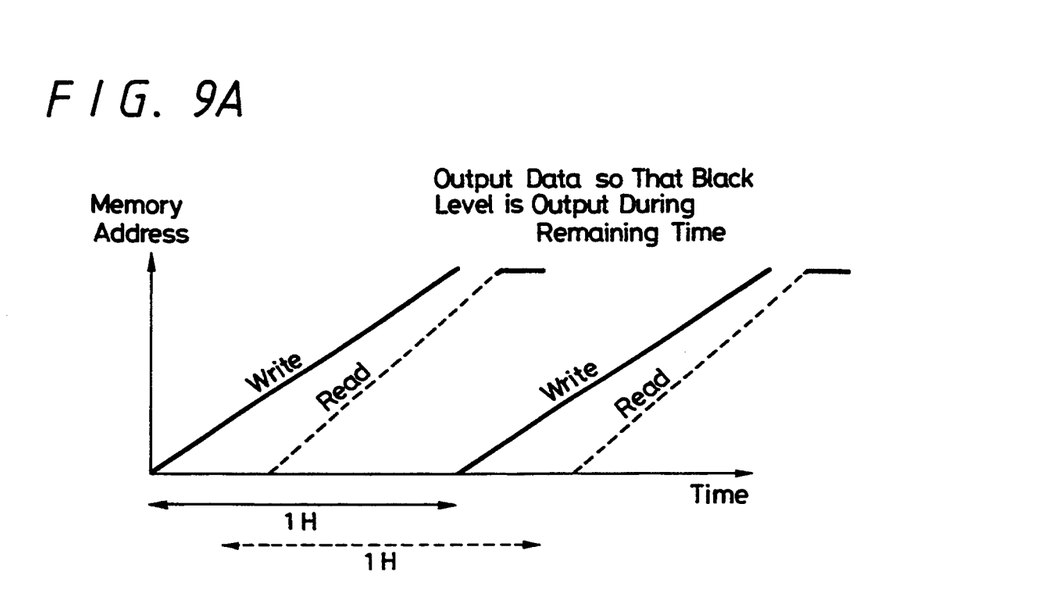
FIGS. 9A and 9B are respectively diagrams used to explain operation of a horizontal direction reduction processing circuit used in the present invention.
Figure 9B:
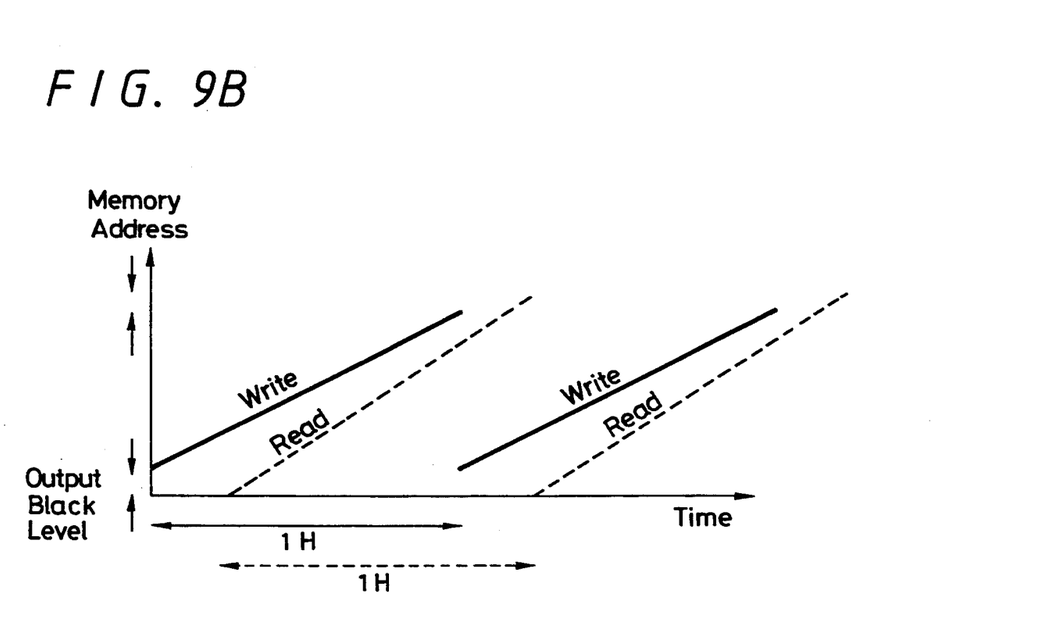

A horizontal direction reduction processing circuit 24 is formed of a line memory. In the horizontal direction reduction processing circuit 24, the reduction processing is carried out by controlling write/read of the line memory as shown in FIGS. 9A and 9B. Further, a horizontal direction enlargement processing can be carried out by an FIR filter arrangement similarly to the vertical direction enlargement processing.

In the case of the 16:9 mode signal, a switch SW1 is connected to a fixed contact b and a switch SW2 is connected to a fixed contact b so that the enlargement/reduction processing is not carried out. In the case of the 4:3 mode signal, the switch SW1 is connected to the fixed contact b and the switch SW2 is connected to the fixed contact a so that a picture in the horizontal direction is squeezed. Further, when a picture of the letter box-type signal is enlarged in size and then displayed, the switch SW1 is connected to the fixed contact a and the switch SW2 is connected to the fixed contact b. The signal thus processed by the horizontal direction reduction processing circuit 24 is supplied through the switch SW2 to a digital-to-analog (D/A) converter 25, in which it is converted into an analog signal and then delivered as an output signal. The enlargement/reduction processing in the horizontal/vertical direction can be effected by using the FIR type filter of the horizontal/vertical direction as described in U.S. Pat. No. 5,089,893.

As described above, according to the video signal transmitting apparatus of the present invention, since the aspect ratio is converted into the code signal (code signal generating circuit 4) by the letter box type video signal (video signal source 1) and then transmitted (inserting and adding circuit 5) together with the video signal, the control operation such as the enlargement (image processing circuit 8) or the like when a reproduced picture is displayed can be carried out automatically.

In the aforesaid video signal transmitting apparatus, if the aspect ratio code signal is supplied from the VCR 6 separately, then the aspect ratio code signal is directly supplied to the decoder 9 to thereby effect the above control operation. Further, the reproduced picture can be enlarged and/or reduced in size by controlling the deflection width of any one of the horizontal and vertical directions of the monitor receiver 10. These processings are illustrated in a table of FIG. 10.

In the above-mentioned video signal transmitting apparatus, the aspect ratio input means 3, the code signal generating circuit 4 and the code signal inserting and adding circuit 5 provided between points A and B in FIG. 2 may be incorporated into the video signal source 1 or incorporated into the VCR 6. Also, the image processing circuit 8 and the decoder 9 provided behind a point C are incorporated into the monitor receiver 10.

While the two aspect ratios of Vista Vision size and Cinema Scope size are prepared in the aforesaid apparatus, the present invention is not limited thereto and a wide variety of aspect ratios may be converted into code signals. Furthermore, numerical values of aspect ratios may be directly converted into data and then transmitted. In these cases, the transmission of data may be effected at the unit of several fields.

According to the present invention, since the aspect ratio is converted into the code signal in the letter box type video signal and then transmitted together with the video signal, the control operation such as the enlargement or the like when a reproduced picture is displayed can be carried out automatically.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A method of transmitting a video signal comprising the steps of:

generating a video signal of letter-box type and outputting the same;

converting an aspect ratio of letter-box type video signal into a code signal and superimposing the same upon a vertical blanking period of said video signal;

superimposing said code signal upon 20th and 283rd horizontal lines of said video signal; and forming said code signal of 20-bit data, said 20-bit data consisting of a word of 6 bits, two words, each formed of 4 bits, and an error detecting code of 6 bits, and using a first bit of said 6-bit word to signify whether a video signal is a video signal of letter-box type.

2. An apparatus for recording a video signal comprising:

code signal generating means for converting an aspect ratio of a letter-box type of an input video signal into a code signal;

code signal adding means for adding said code signal to said video signal; and recording means for recording said video signal added with said code signal on a recording medium, wherein said code signal is formed of 20-bit data, said 20-bit data consisting of a word of 6 bits, two words, each formed of 4 bits, and an error detecting code of 6 bits, a first bit of said 6-bit word being used to signify whether a video signal is a video signal of letter-box type.

3. The apparatus according to claim 2, wherein said code signal adding means adds said code signal to a vertical blanking period of said video signal.

4. The apparatus according to claim 2, wherein said code signal adding means modulates a control signal in duty by said code signal and said control signal thus modulated is recorded on said recording medium together with said video signal by said recording means.

5. The apparatus according to claim 2, further comprising:

audio signal processing means for encoding an audio signal and converting the same into a PCM audio signal; and audio signal recording means for recording said PCM audio signal on a track of said recording medium at an area different from an area in which a video signal is recorded, wherein said code signal adding means adds said code signal to a portion provided between said PCM audio signal and said video signal and said recording means records said code signal, said PCM audio signal, and said video signal on tracks of said recording medium.

6. A method of recording a video signal comprising the steps of:

generating a code signal in response to an aspect ratio of a letter-box type input video signal;

adding said code signal to said video signal;

recording said video signal added with said code signal on a recording medium; and forming said code signal of 20-bit data, said 20-bit data consisting of a word of 6 bits, two words, each formed of 4 bits, and an error detecting code of 6 bits, a first bit of said 6-bit word being used to signify whether a video signal is a video signal of letter-box type.

7. The method according to claim 6, wherein said code signal adding step adds said code signal to a vertical blanking period of said video signal.

8. The method according to claim 6, wherein said code signal adding step modulates a control signal in duty by said code signal and said recording step records said control signal on said recording medium together with said video signal.

9. The method according to claim 6, further comprising:

encoding an audio signal and converting the same into a PCM audio signal; and recording said PCM audio signal on a track of said recording medium at an area different from an area in which said video signal is recorded, wherein said code signal adding step adds said code signal to a portion provided between said PCM audio signal and said video signal and said recording step records said code signal, said PCM audio signal, and said video signal on tracks of said recording medium.

* * * * *